(12) United States Patent
Kaneko (10) Patent No.: US 7,987,273 B2
(45) Date of Patent: Jul. 26, 2011

(54) SERVER APPARATUS, MOBILE TERMINAL, ELECTRIC APPLIANCE, COMMUNICATION SYSTEM, COMMUNICATION METHOD, AND PROGRAM

(75) Inventor: Tomoharu Kaneko, Kanagawa (JP)

(73) Assignee: Panasonic Corporation, Osaka (JP)

(*) Notice: Subject to any disclaimer, the term of this patent is extended or adjusted under 35 U.S.C. 154(b) by 1062 days.

(21) Appl. No.: 11/719,281

(22) PCT Filed: Nov. 14, 2005

(86) PCT No.: PCT/JP2005/020873
§ 371 (c)(1),
(2), (4) Date: May 14, 2007

(87) PCT Pub. No.: WO2006/054529
PCT Pub. Date: May 26, 2006

(65) Prior Publication Data
US 2009/0077239 A1    Mar. 19, 2009

(30) Foreign Application Priority Data
Nov. 16, 2004 (JP) ................. 2004-332021

(51) Int. Cl.
*G06F 15/16* (2006.01)
(52) U.S. Cl. ........................ 709/227; 713/156
(58) Field of Classification Search .......... 709/227–229; 370/310, 351; 713/156
See application file for complete search history.

(56) References Cited

U.S. PATENT DOCUMENTS

| | | | |
|---|---|---|---|
| 6,112,088 A * | 8/2000 | Haartsen | 455/437 |
| 6,643,816 B1 | 11/2003 | Uesugi | |
| 6,886,095 B1 * | 4/2005 | Hind et al. | 713/168 |
| 7,114,175 B2 * | 9/2006 | Lahteenmaki | 726/4 |
| 7,308,257 B2 * | 12/2007 | Ham et al. | 455/433 |
| 7,418,511 B2 * | 8/2008 | Takechi et al. | 709/229 |
| 7,441,043 B1 * | 10/2008 | Henry et al. | 709/238 |
| 7,444,508 B2 * | 10/2008 | Karjala et al. | 713/156 |
| 2002/0075844 A1 * | 6/2002 | Hagen | 370/351 |
| 2002/0116344 A1 * | 8/2002 | Kinoshita et al. | 705/65 |
| 2002/0147819 A1 * | 10/2002 | Miyakoshi et al. | 709/228 |

(Continued)

FOREIGN PATENT DOCUMENTS

JP    63-82145    4/1988

(Continued)

OTHER PUBLICATIONS

PCT International Search Report dated Feb. 14, 2006.

(Continued)

*Primary Examiner* — Krisna Lim
(74) *Attorney, Agent, or Firm* — Dickinson Wright PLLC (57) ABSTRACT

A server apparatus, a mobile terminal, an electric appliance, a communication system, a communication method and a program for notifying a mobile terminal user in the open of the cause of a failure of P2P connection. In a communication system, an electric appliance (101), a server apparatus (103) and a mobile terminal (105) each detect a failure in preparation for P2P connection between the electric appliance (101) and the mobile terminal (105). When the electric appliance (101) detects the failure, it notifies the mobile terminal (105) of the failure via the server apparatus (103). When the server apparatus (103) detects the failure, it notifies the mobile terminal (105) of the failure. The mobile terminal (105) notifies the user of the failure detected by the mobile terminal itself or of the failure notified of by the server apparatus (103).

5 Claims, 9 Drawing Sheets

U.S. PATENT DOCUMENTS

| | | | |
|---|---|---|---|
| 2003/0182559 A1* | 9/2003 | Curry et al. | 713/189 |
| 2003/0188005 A1 | 10/2003 | Yoneda | |
| 2004/0022258 A1* | 2/2004 | Tsukada et al. | 370/401 |
| 2004/0044778 A1* | 3/2004 | Alkhatib et al. | 709/228 |
| 2004/0242220 A1 | 12/2004 | Matsunaga | |
| 2005/0120071 A1* | 6/2005 | Wakamatsu | 709/200 |
| 2006/0185012 A1* | 8/2006 | Olivereau et al. | 726/14 |
| 2006/0262929 A1* | 11/2006 | Vatanen et al. | 380/255 |
| 2008/0077534 A1* | 3/2008 | Son | 705/76 |

FOREIGN PATENT DOCUMENTS

| | | |
|---|---|---|
| JP | 2001-094537 | 4/2001 |
| JP | 2001-309040 A | 11/2001 |
| JP | 2001345841 | 12/2001 |
| JP | 2002141953 | 5/2002 |
| JP | 2003-234843 A | 8/2003 |
| JP | 2003-255959 | 9/2003 |
| WO | 0008821 | 2/2000 |
| WO | 0201820 | 1/2002 |

OTHER PUBLICATIONS

Notice of the Reasons for Rejection mailed Feb. 2, 2010, issued in corresponding Japanese Patent Application No. 2004-332021, filed Nov. 16, 2004, 2 pages.

Notice of the Reasons for Rejection dated Jul. 6, 2010.

* cited by examiner

SERVER APPARATUS, MOBILE TERMINAL, ELECTRIC APPLIANCE, COMMUNICATION SYSTEM, COMMUNICATION METHOD, AND PROGRAM

TECHNICAL FIELD

The present invention relates to a server apparatus, mobile terminal, electrical appliance, communication system, and communication method and program.

BACKGROUND ART

In recent years, the popularity of the continuous connection environment of the Internet has continued to grow, and various electrical appliances are being connected to a network. Such company or home network environments (herein after referred to as "private network") usually access the Internet via a router having NAT (Network Address Translation)/NAPT (Network Address Port Translation) functions.

A user can connect directly (P2P connection) from outside the private network (herein after referred to as "out-of-house") to such electrical appliances by means of a mobile terminal, and it is possible to use the contents which are stored in the electrical appliances and remote-control the electrical appliances, and also, it is possible that service providers that support the P2P connection between the mobile terminal and the electrical appliances, will appear.

In order to establish a P2P connection from out-of-house mobile terminals to electrical appliances inside the private network (herein after referred to as "in-house"), translation of the address using NAT is required, for example, it is necessary to add the entry of the in-house electrical appliances, in other words, the address and the port translation table of the electrical appliances to a NAT router as that described in Patent Document 1.

A manual port forwarding setting which uses static port mapping, and a method which uses a UPnP (Universal Plug and Play) gateway function are given as methods of adding an entry of the in-house electrical appliances to a NAT router.

Patent Document 1: Japanese Patent Application Laid-Open No. 2001-345841

DISCLOSURE OF INVENTION

Problems to be Solved by the Invention

However, in collective housing such as condominium building or the like, a private network accesses the Internet via a plurality of NAT routers. Consequently, with the method of adding the entries of in-house electrical appliances to a NAT router, as described above, cases occur where a P2P connection from the out-of-house mobile terminal to the in-house electrical appliances cannot be established. Also, in spite of the fact that the P2P connection from the out-of-house mobile terminal to the in-house electrical appliances can be established at the beginning, when the connection environment of the private network to the Internet change, cases occur where the P2P connection can no longer be established. There is a problem that a user of the out-of-house mobile terminal cannot know the causes for such P2P connection failure. In particular, this becomes a problem when access to the Internet is provided via a different type of network, such as a mobile phone.

It is therefore an object of the present invention to provide a server apparatus, mobile terminal, electrical appliance, communication system, and communication method and program that report the cause of a P2P connection failure to a user of an out-of-house mobile terminal.

Means for Solving the Problem

The server apparatus of the present invention performs preparation processing for direct connection between an electrical appliance inside a private network connected to the Internet, and a mobile terminal outside the private network, and this server apparatus employs a configuration having: a detecting section that detects a failure in the preparation processing for direct connection between the electrical appliance and the mobile terminal; and a reporting section that reports information showing the failure detected by the detecting section, to the mobile terminal.

The mobile terminal of the present invention is outside a private network and establishes direct connection to an electrical appliance inside a private network connected to the Internet, and this mobile terminal employs a configuration having: a detecting section that detects a failure in preparation processing for direct connection between the electrical appliance and the mobile terminal or receives information showing the failure; and a reporting section that reports the information showing the failure to a user.

The electrical appliance of the present invention employs a configuration having: a NAT setting control section that controls settings of a NAT router; and a NAT setting information reporting section that, when the NAT setting control section fails to control the settings of the NAT router, reports information showing the failure to a server apparatus.

Advantageous Effect of the Invention

According to the present invention, by detecting a failure in the preparation processing of a P2P connection between an electrical appliance and a mobile terminal and reporting information showing the detected failure to the mobile terminal, it is possible to report the cause of the P2P connection failure to the user of the out-of-house mobile terminal.

BEST MODE FOR CARRYING OUT THE INVENTION

Now, embodiments of the present invention will be described in detail with reference to the accompanying drawings. The embodiments will be described assuming a mobile phone (herein after referred to as "mobile terminal") that is provided with function for accessing the Internet and that is capable of receiving and sending emails and viewing web pages. In the present embodiments, components having the same functions are designated by the same reference numerals and overlapping descriptions thereof will be omitted.

Embodiment 1

Figure 1:
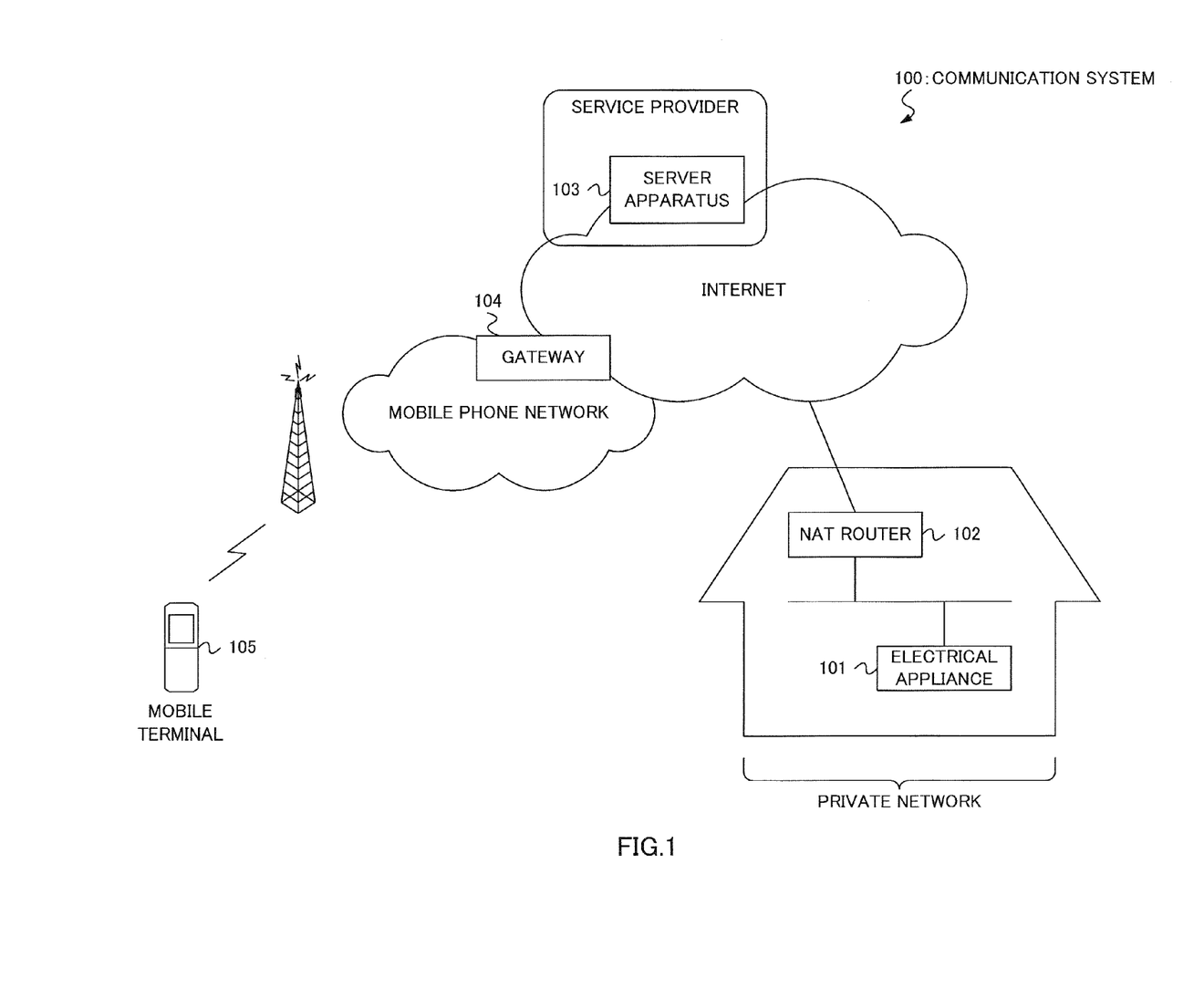
FIG. 1 is a block diagram showing a configuration of a communication system according to embodiment 1 of the present invention.

As shown in FIG. 1, in communication system 100 according to embodiment 1 of the present invention, mainly, the Internet network and a mobile phone network are connected by gateway 104, and the Internet network is connected to a private network. The private network is comprised of electrical appliance 101 and NAT router 102, and the like.

Electrical appliance 101 is generally called appliance for the Internet and is an electrical household appliance having functions for accessing the Internet, and is connected to NAT router 102. Also, it may also be connected to various other electrical appliances (not illustrated).

NAT router 102 is connected to electrical appliance 101, and allocates a private address to electrical appliance 101 to which it is connected, and relays the connection between electrical appliance 101 and the Internet network by carrying out cross-translation of the global IP address and the private address allocated to the private network. Since NAT router 102 is oftentimes an invisible existence in the receptions and transmissions between electrical appliance 101 and Internet server apparatus 103, and there are cases where electrical appliance 101 and server apparatus 103 look like they are communicating directly with each other.

Server apparatus 103 is provided in the Internet network, and as a service provider, establishes sessions with a plurality of electrical appliances, and holds and manages the established sessions. Similarly, as a service provider, server apparatus 103 establishes sessions with mobile terminal 105.

Gateway 104 carries out protocol conversion, address translation and the like of the packets transmitted from and received by mobile terminal 105, and realizes session establishment and data communication from mobile terminal 105 to server apparatus 103. Mobile terminal 105 is connected to the mobile phone network by wireless connection to establish a session with server apparatus 103 which has established a session with electrical appliance 101, and acquires information regarding the private network, via server apparatus 103. Then, based on the acquired information, direct connection (herein after referred to as "P2P") communication is established with electrical appliance 101.

Figure 2:
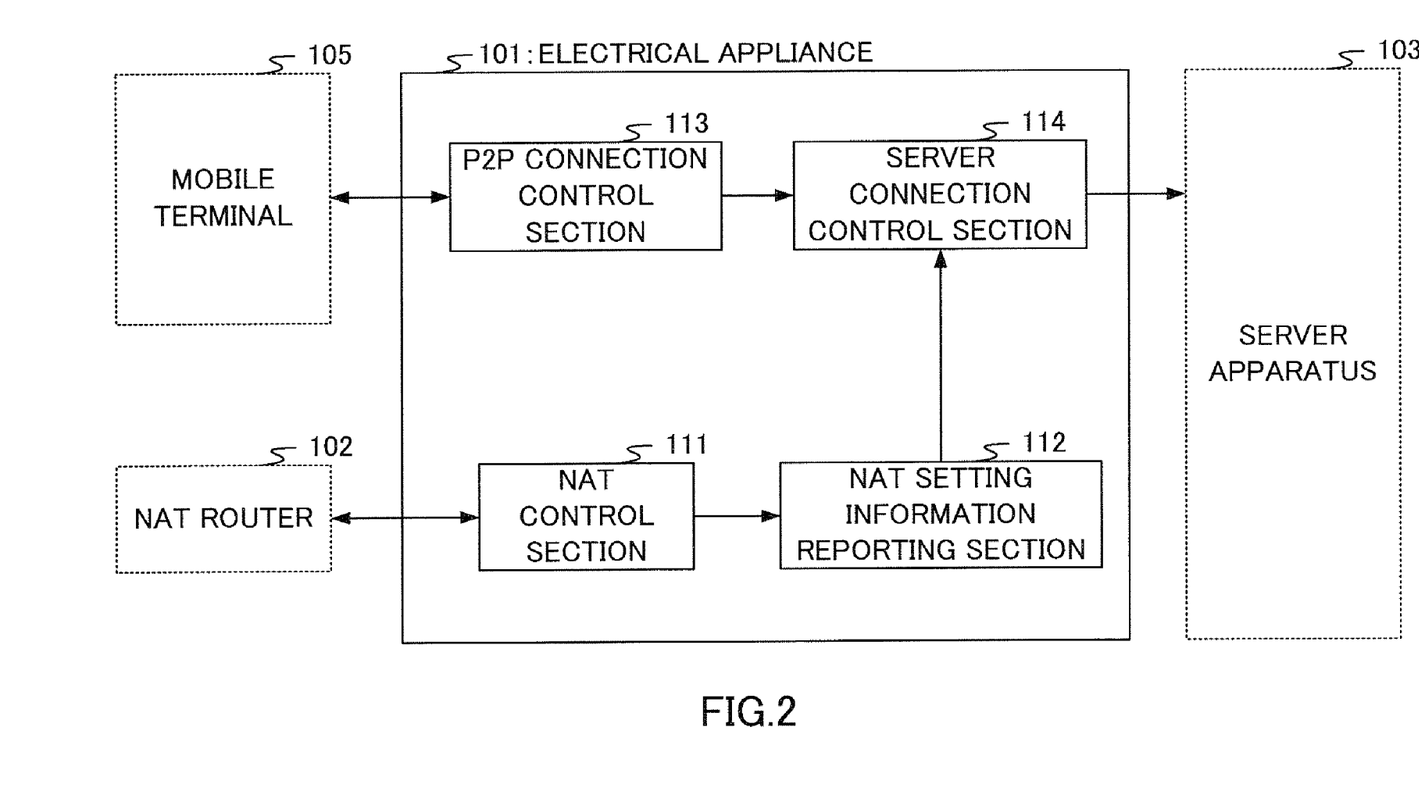
FIG. 2 is a block diagram showing the internal configuration of the electrical appliance shown in FIG. 1.

FIG. 2 is a block diagram showing an internal configuration of electrical appliance 101 shown in FIG. 1. In this figure, NAT control section 111 controls the settings of NAT router 102 when the power is turned on, to thereby send a packet, to be sent to one port number from the Internet, to electrical appliance 101 itself. NAT control section 111 controls the settings of NAT router 102 and acquires the global IP address on the Internet-side of NAT router 102. The concrete procedure for acquiring concrete settings and the global IP address of NAT router 102 utilizes methods such as UPnP (Universal Plug and Play). The setting information and the global IP address of NAT router 102 (herein after simply referred to as "address information") are outputted to NAT setting information reporting section 112.

Electrical appliance 101 does not control NAT router 102, but the user sets in advance NAT router 102 and registers the setting information in electrical appliance 101, and therefore, the registered setting information of NAT router 102 may be reported to server apparatus 103.

NAT setting information reporting section 112 reports the setting information and the address information of NAT router 102 outputted from NAT control section 111, to server apparatus 103, via server connection control section 114 (described later). Upon receiving the packet transmitted from mobile terminal 105, P2P connection control section 113 carries out transmission and reception of packets to/from mobile terminal 105 to confirm connectivity, and reports this information to server apparatus 103 via server connection control section 114.

Server connection control section 114 is an interface that controls the connection with server apparatus 103 and mediates the communication between NAT setting information reporting section 112 and server apparatus 103, and the communication between P2P connection control section 113 and server apparatus 103.

Figure 3:
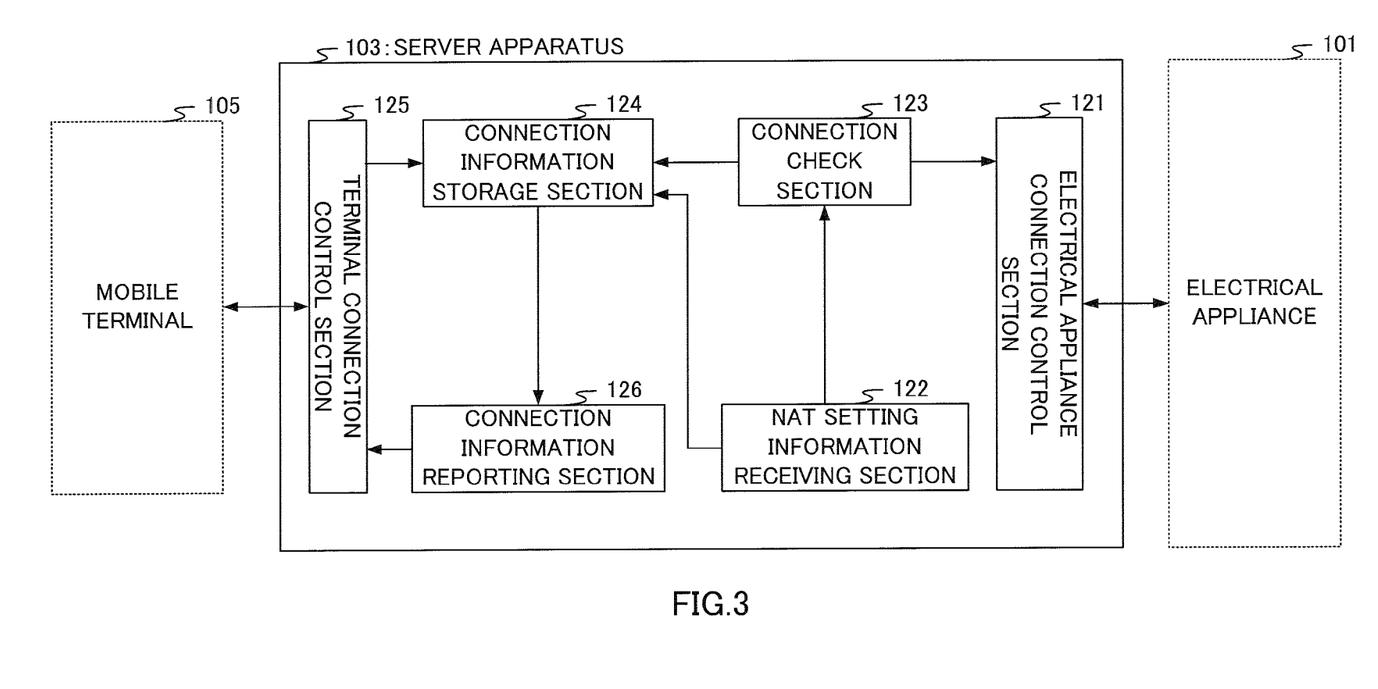
FIG. 3 is a block diagram showing the internal configuration of the server apparatus shown in FIG. 1.

FIG. 3 is a block diagram showing an internal configuration of server apparatus 103 shown in FIG. 1. In this figure, electrical appliance connection control section 121 is an interface that mediates the connection with electrical appliance 101, and controls the communication between NAT setting information receiving section 122 and electrical appliance 101, and the communication between control check section 123 and electrical appliance 101.

NAT setting information receiving section 122 receives the setting information and address information of NAT router 102, from electrical appliance 101, and reports the received information to connection check section 123. Also, upon receiving the report from server apparatus 103 that control for the settings of NAT router 102 has failed, NAT setting information receiving section 122 stores in connection information storage section 124 the fact that connection to electrical appliance 101 is not possible.

Connection check section 123 attempts to connect to electrical appliance 101 based on the setting information and the address information of NAT router 102 reported from NAT setting information receiving section 122. If connection to electrical appliance 101 is successful, connection check section 123 stores the setting information and address information of NAT router 102 in connection information storage section 124, as connection information.

Terminal connection control section 125 is an interface that controls the connection with mobile terminal 105, and mediates the communication between connection information storage section 124 and mobile terminal 105, and the communication between connection information reporting section 126 and mobile terminal 105. More concretely, when it accepts the connection from mobile terminal 105 to establish a session, terminal connection control section 125 reports this to connection information storage section 124. Also, a request to connect from mobile terminal 105 to electrical appliance 101, as well as acquired identification information of electrical appliance 101 to which connection is desired, are reported to connection information storage section 124.

Connection information reporting section 126 acquires connection information for the electrical appliance from connection information storage section 124 which has acquired the identification information of electrical appliance 101, and reports the acquired connection information to mobile terminal 105, via terminal connection control section 125.

Figure 4:
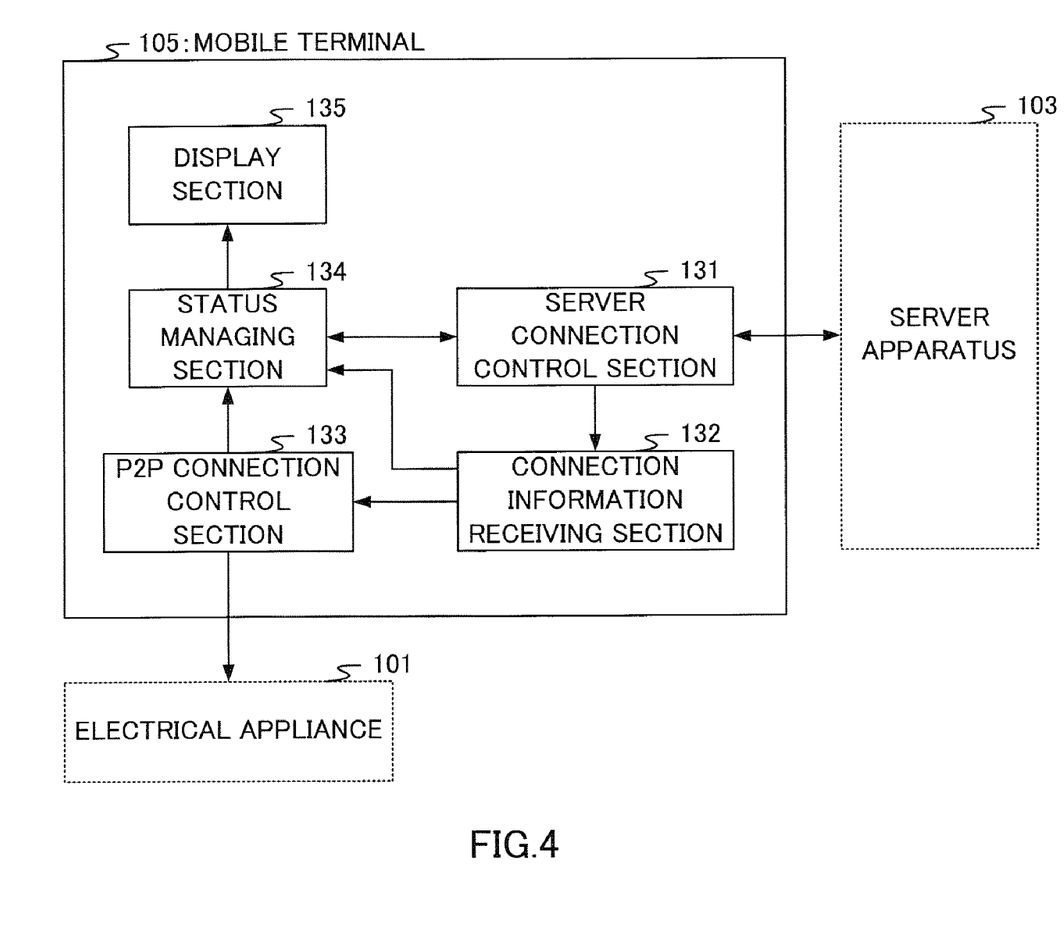
FIG. 4 is a block diagram showing the internal configuration of the mobile terminal shown in FIG. 1.

FIG. 4 is a block diagram showing the internal configuration of mobile terminal 105 shown in FIG. 1. In this view, server connection control section 131 is an interface that controls the connection to server apparatus 103, and mediates the communication between connection information receiving section 132 and server apparatus 103 and the communication between status managing section 134 and server apparatus 103.

Status managing section 134 transmits the identification information of electrical appliance 101 to which connection is desired, to server apparatus 103, via server connection control section 131. If the connection of server connection control section 131 to server apparatus 103 is successful, status managing section 134 receives the connection success report from server connection control section 131.

When connection information receiving section 132 acquires the connection information for electrical appliance 101 to which connection is desired, from server apparatus 103 via server connection control section 131, it reports the connection information to P2P connection control section 133, and reports the acquisition of the connection information to status managing section 134.

P2P connection control section 133 attempts to connect by transmitting packets to electrical appliance 101 based on the connection information acquired from connection information receiving section 132. If the packets transmitted from P2P connection control section 133 are correctly transmitted to electrical appliance 101 by NAT router 102 in a private network, P2P connection control section 133 receives and transmits packets to and from P2P connection control section 113 of electrical appliance 101 to confirm connectivity with electrical appliance 101 and reports this information to status managing section 134.

Status managing section 134 receives a report from P2P connection control section 133 that connection with electrical appliance 101 is successful, and displays the fact that connection has been successful on display section 135.

Figure 5:
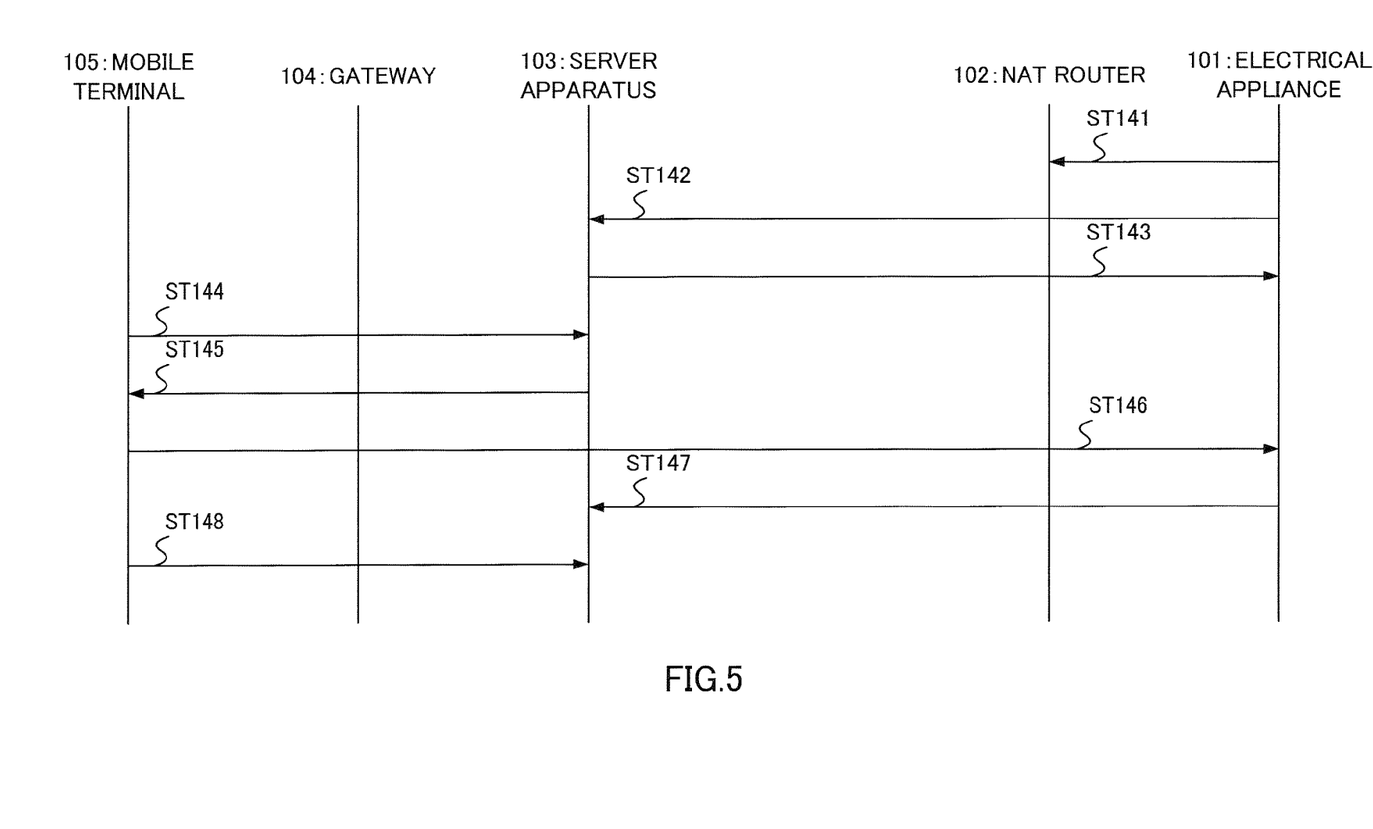
FIG. 5 is a sequence diagram showing the sequence of the processing for preparing the P2P connection between the electrical appliance and the mobile terminal.

Next, a description will be given of the sequence of processing for preparing the P2P connection between electrical appliance 101 and mobile terminal 105 in the communication system having the above configuration, using FIG. 5. In FIG. 5, in step (herein after referred to as "ST") 141, electrical appliance 101 controls the setting of NAT router 102 and acquires the address information of NAT router 102 (global IP address on the Internet side), and in ST 142, it reports the acquired setting information and address information to server apparatus 103.

In ST 143, server apparatus 103 attempts to connect to electrical appliance 101 based on the setting information and address information (connection information) of NAT router 102, acquired from electrical appliance 101. If the connection is successful, server apparatus 103 stores the connection information.

In ST 144, mobile terminal 105 is connected to server apparatus 103, and transmits the identification information of electrical appliance 101 to which connection is desired, to server apparatus 103. In ST 145, server apparatus 103 searches the connection information for electrical appliance 101 stored inside server apparatus 103, based on the identification information acquired from mobile terminal 105, and transmits the connection information to mobile terminal 105.

In ST 146, mobile terminal 105 attempts a P2P connection to electrical appliance 101, based on the connection information for electrical appliance 101 acquired from server apparatus 103. If the connection is successful, in ST 147, electrical appliance 101 reports the success of the P2P connection to mobile terminal 105, to server apparatus 103. Next, in ST 148, mobile terminal 105 reports, to server apparatus 103, the fact that the P2P connection to electrical appliance 101 has been successful.

Herein, a description has been given where, in ST 141 and ST 142, the connection information for electrical appliance 101 is registered in advance from electrical appliance 101 to server apparatus 103, and in ST 144 and ST 145, the registered connection information is reported from server apparatus 103 to mobile terminal 105, in accordance with the connection from mobile terminal 105 to server apparatus 103. However, server apparatus 103 may request the connection information from electrical appliance 101, after establishing connection with mobile terminal 105. In this case, a session is established between server apparatus 103 and electrical appliance 101, and if necessary, a message (request message) for requesting connection information is transmitted to electrical appliance 101. Alternatively, if necessary, server apparatus 103 may call electrical appliance 101 and transmit the request message to electrical appliance 101.

Next, the steps for when P2P connection between electrical appliance 101 and mobile terminal 105 is not successful, will be described with reference to a number of possible cases. Possible cases include a case where mobile terminal 105 fails to connect to server apparatus 103, a case where server apparatus 103 fails to acquire the connection information for electrical appliance 101, a case where electrical appliance 101 fails to control the settings of NAT router 102, a case where server apparatus 103 fails to confirm the connection with electrical appliance 101, and further, and a case where mobile terminal 105 fails to establish a P2P connection with electrical appliance 101.

First, a description will be given of a case where mobile terminal 105 fails to connect to server apparatus 103. If server connection control section 131 of mobile terminal 105 attempts to connect to server apparatus 103 and this connection fails, server connection control section 131 of mobile terminal 105 reports the fact that connection to server apparatus 103 has failed, to status managing section 134. Herein, server connection control section 131 functions as a detecting section.

In this case, possible reason for the connection failure may include failure in the network environment (corresponding to the mobile phone network in the present embodiment) of mobile terminal 105 itself, failure in the Internet environment, and failure of server apparatus 103. More detailed reasons for these failures (including the point where the failure occurred, reason the failure occurred, etc) can be estimated by acquiring error information from gateway 104.

Status managing section 134 of mobile terminal 105 reports to the user the failure of connection with server apparatus 103, by displaying this on display section 135. At this time, the estimated reason as described above may be displayed on display section 135. Next, a description will be given of a case where server apparatus 103 fails to acquire connection information for electrical appliance 101. Mobile terminal 105 is connected to server apparatus 103 to transmit the identification information of electrical appliance to which connection is desired, to server apparatus 103.

At this time, when the connection information for above electrical appliance 101 is not stored in connection information storage section 124 and the connection information cannot be transmitted to mobile terminal 105, server apparatus 103 reports the failure of acquisition of the connection information to mobile terminal 105. Here, connection information storage section 124 functions as a detecting section.

In this case, possible reasons for the failure of acquisition of connection information may include that the connection information for above electrical appliance 101 is not registered and that above electrical appliance 101 could not be called.

On the other hand, in mobile terminal 105, status managing section 134 receives a report that acquisition of the connection information from server apparatus 103 has failed, and status managing section 134 reports this to the user by displaying this on display section 135. At this time, the estimated reason may also be displayed on display section 135.

Next, a description will be given of a case where electrical appliance 101 fails to control the settings of NAT router 102. NAT control section 111 of electrical appliance 101 controls the settings of NAT router 102, and when NAT control section 111 fails in this setting control, NAT setting information reporting section 112 reports this setting control failure to server apparatus 103. Here, NAT control section 111 functions as a detecting section.

In this case, possible reasons for the setting control failure may include that NAT router 102 does not support the NAT control scheme employed by electrical appliance 101 such as UPnP.

On the other hand, in server apparatus 103, NAT setting information receiving section 122 receives a report of the failure in the setting control in NAT router 102 from electrical appliance 101, and stores the fact that connection to above electrical appliance 101 is not possible, in connection information storage section 124. Here, when mobile terminal 105 is connected to server apparatus 103 and transmits the identification information of electrical appliance 101 to which connection is desired, to server apparatus 103, server apparatus 103 searches connection information storage section 124 and transmits information indicating that above electrical appliance 101 has failed in controlling the settings of NAT router 102, to mobile terminal 105. In mobile terminal 105, connection information receiving section 132 receives a report from server apparatus 103 that setting control has failed, and status managing section 134 reports the user by displaying this on display section 135. At this time, the estimated reason may be displayed on display section 135.

Next, a description will be given of a case where server apparatus 103 has failed to confirm the connection with electrical appliance 101. Electrical appliance 101 controls the setting of NAT router 102, and reports the setting information and address information of NAT router 102 to server apparatus 103.

In server apparatus 103, NAT setting information receiving section 122 receives the setting information and the address information of NAT router 102 from electrical appliance 101, and based on this information, connection check section 123 attempts to connect to electrical appliance 101.

At this time, if connection to electrical appliance 101 fails, connection check section 123 stores in connection information storage section 124 information indicating that electrical appliance 101 has performed setting control for NAT router 102 but connection to this electrical appliance 101 is not possible. Here, connection check section 123 functions as a detecting section.

In this case, possible reasons for the connection failure to electrical appliance 101 may include problems arising from the network environment at the user's home, including the presence of a plurality of NAT routers in the private network and the fact that the Internet service provider (ISP), to which the user subscribes, assigns a private address to the user's home and the private network is not directly connected to the Internet.

Here, when mobile terminal 105 is connected to server apparatus 103 and transmits the identification information of electrical appliance 101 to which connection is desired, to server apparatus 103, server apparatus 103 searches connection information storage section 124 and thus transmits to mobile terminal 105, information indicating that above electrical appliance 101 has performed setting control for NAT router 102 but connection to the above electrical appliance is not possible.

In mobile terminal 105, connection information receiving section 132 receives from server apparatus 103, the information indicating that above electrical appliance 101 has performed setting control for NAT router 102 but connection to above electrical appliance 101 is not possible. Status managing section 134 reports this to the user by displaying this on display section 135. At this time, the estimated reason is displayed on display section 135.

Next, a description will be given of a case where mobile terminal 105 fails to establish P2P connection with electrical appliance 101. From the sequence of processing until when the P2P connection between electrical appliance 101 and mobile terminal 105 shown in FIG. 5 is successful, the processing from ST 141~ST 145 is carried out, and P2P connection control section 133 of mobile terminal 105 attempts to establish a P2P connection to electrical appliance 101, based on the connection information for electrical appliance 101. If this connection fails, P2P connection control section 133 of mobile terminal 105 reports to status managing section 134 that P2P connection to electrical appliance 101 has failed. Here, P2P connection control section 133 functions as a detecting section.

In this case, the reason for the P2P connection failure is the same as the reason described when server apparatus 103 fails to confirm the connection to electrical appliance 101. In other words, possible reason may include problems arising from the network environment at the user's home, including the presence of a plurality of NAT routers in the private network and the fact that the Internet service provider (ISP), to which the user subscribes, assigns a private address to the user's home and the private network is not directly connected to the Internet. Also, another possibility is that the private network environment has changed after the connection information for electrical appliance 101 is received.

Status managing section 134 reports the user by displaying the fact that the P2P connection failed, on display section 135. At this time, the estimated reason may be displayed on display section 135.

According to such embodiment 1, in the processing sequence of P2P connection between the mobile terminal and the electrical appliance, by reporting to the user of the mobile terminal in which of the processing sequences lies the cause for the P2P connection failure, it is possible to take measures such as changing the setting of the private network by the user, to thereby eliminate the cause for the user's failure to establish a P2P connection.

Embodiment 2

Figure 6:
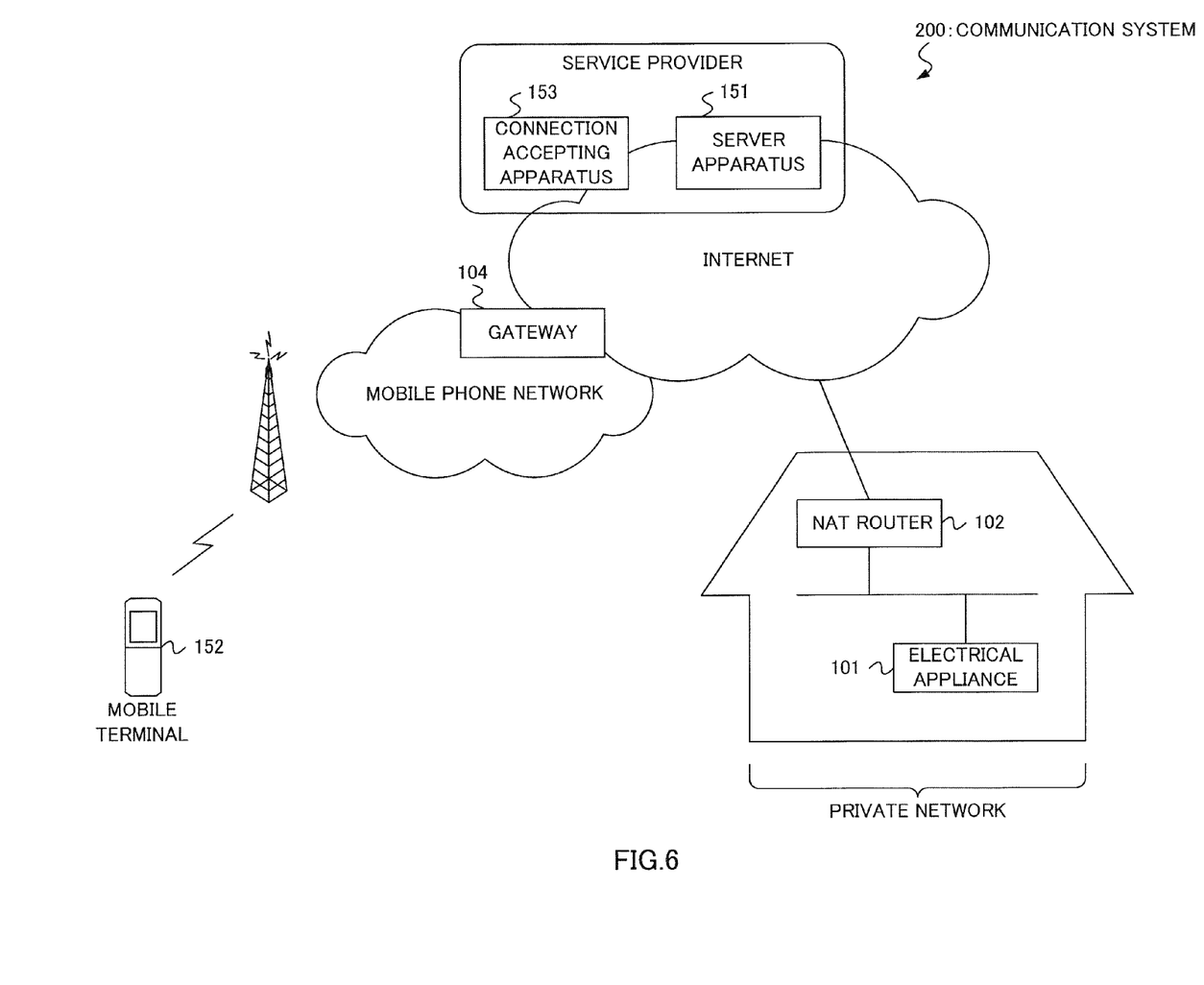
FIG. 6 is a block diagram showing the configuration of the communication system according to embodiment 2 of the present invention.

Communication system 200 according to embodiment 2 of the present invention has essentially the same configuration as the communication system according to embodiment 1. However, as shown in FIG. 6, the service provider contains a connection accepting apparatus. In FIG. 6, if the P2P connection between electrical appliance 101 and mobile terminal 152 is successful, server apparatus 151 receives a report from both electrical appliance 101 and mobile terminal 152 that the P2P connection is successful, and issues an electronic certificate, which certifies that both devices can establish a P2P connection, and transmits it to mobile terminal 152.

Mobile terminal 152 receives the certificate transmitted from server apparatus 151 and stores it. When the mobile terminal user performs user registration with the service provider, mobile terminal 152 is connected to connection accepting apparatus 153 and transmits the certificate it stores to connection accepting apparatus 153.

Connection accepting apparatus 153 receives the certificate transmitted from mobile terminal 152, and checks that the received certificate is issued by server apparatus 151, and that mobile terminal 152 is capable of establishing the P2P connection with electrical appliance 101. If the certificate is found to be correct, registration of the mobile terminal user is carried out.

Figure 7:
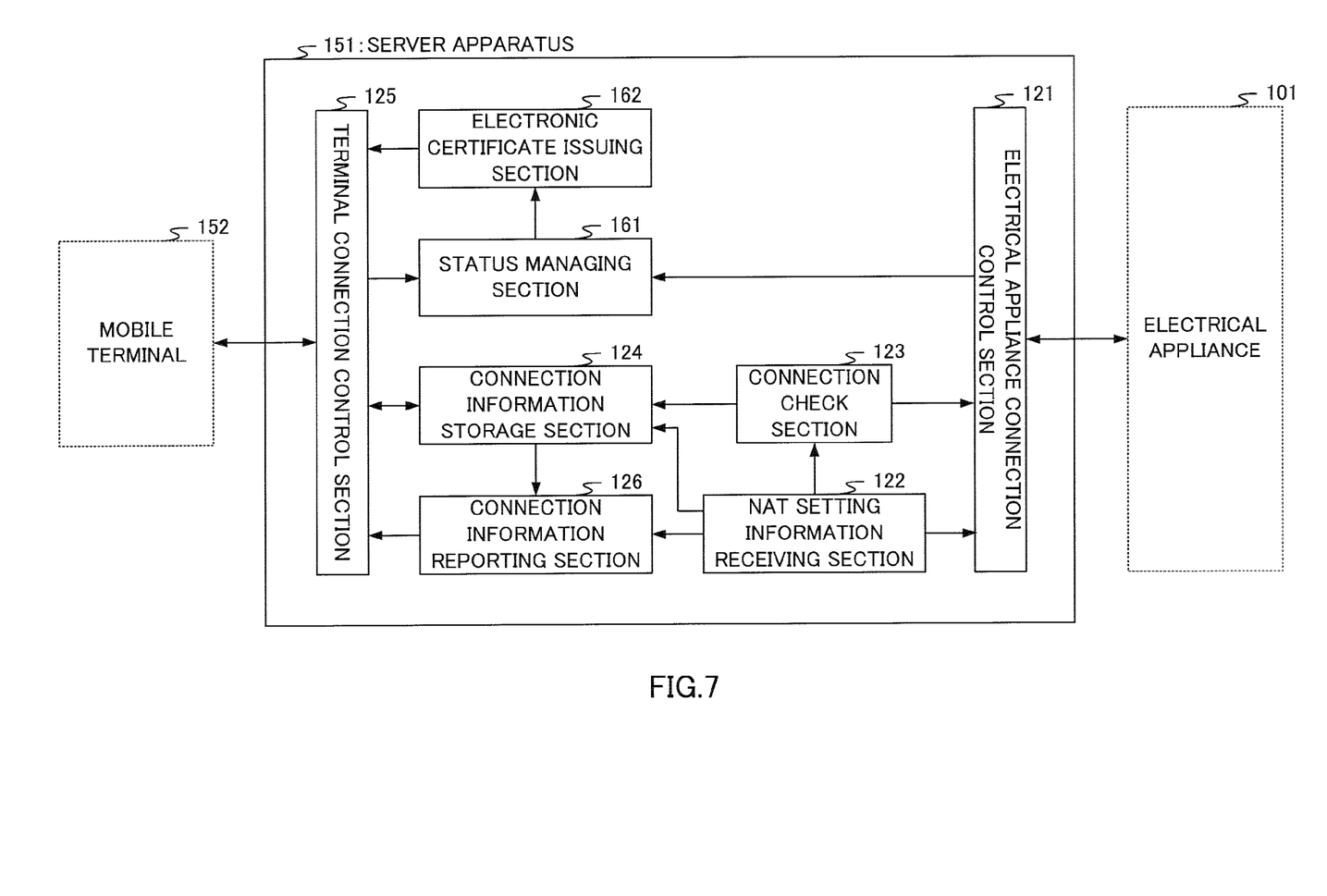
FIG. 7 is a block diagram showing the internal configuration of the server apparatus shown in FIG. 6.

FIG. 7 is a block diagram showing an internal configuration of server apparatus 151 shown in FIG. 6. In this figure, status managing section 161 acquires the P2P connection success report transmitted from electrical appliance 101, which could establish a P2P connection with mobile terminal 152, via electrical appliance connection control section 121. Also, it acquires the P2P connection success report transmitted from mobile terminal 152, which could establish a P2P connection with electrical appliance 101, via terminal connection control section 125. If status managing section 161 confirms the acquisition of the P2P connection success reports transmitted from both electrical appliance 101 and mobile terminal 152, this confirmation is reported to electronic certificate issuing section 162.

Upon receiving the confirmation that status managing section 161 has acquired the P2P connection success reports from both electrical appliance 101 and mobile terminal 152, electronic certificate issuing section 162 issues an electronic certificate which certifies that both devices are capable of establishing a P2P connection, and transmits the issued certificate to mobile terminal 152, via terminal connection control section 125.

Figure 8:
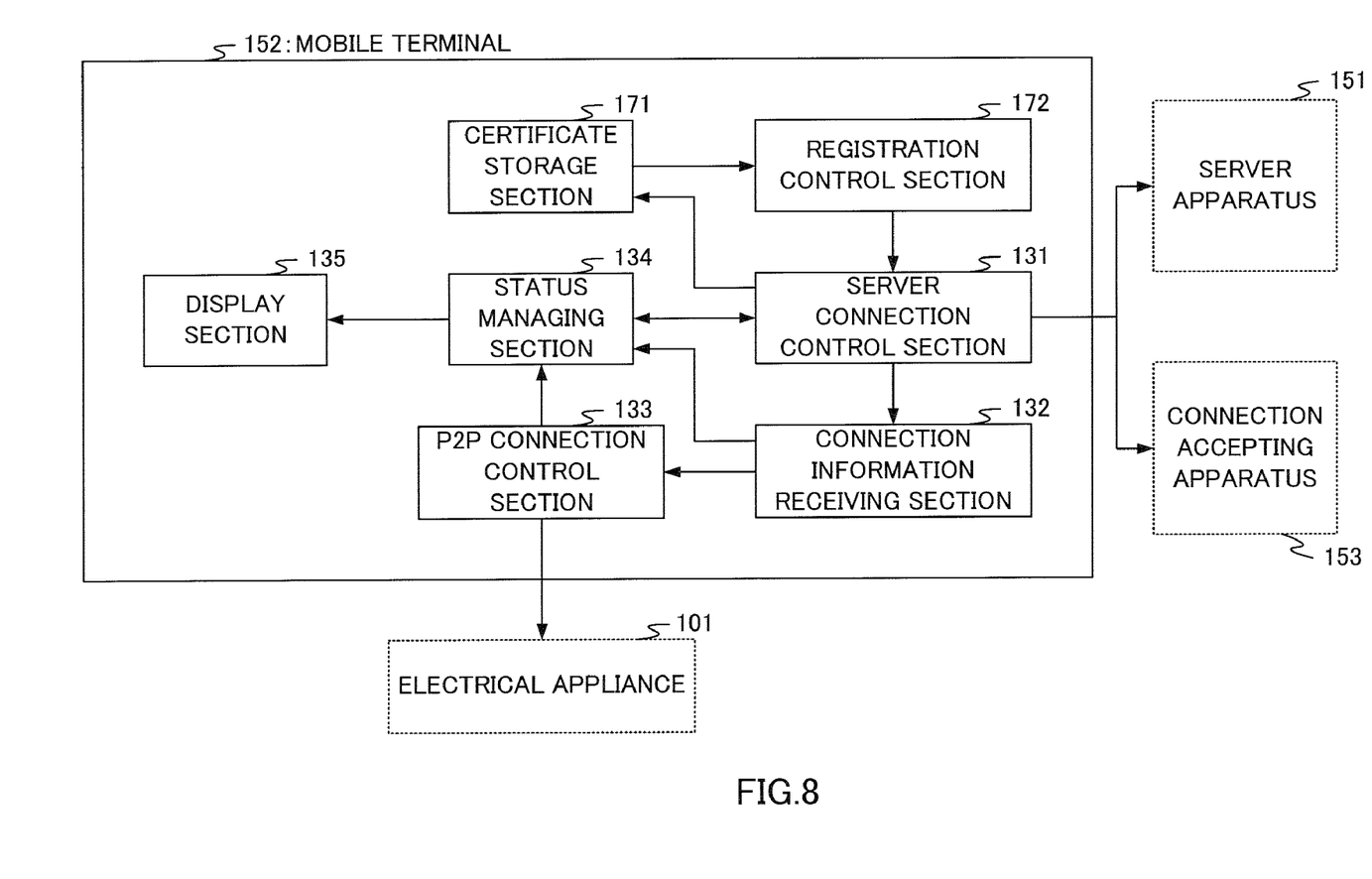
FIG. 8 is a block diagram showing an internal configuration of the mobile terminal shown in FIG. 6.

FIG. 8 is a block diagram showing an internal configuration of mobile terminal 152 shown in FIG. 6. In this figure, certificate storage section 171 acquires the certificate transmitted from server apparatus 151, via server connection control section 131 and stores the acquired certificate.

When the user performs user registration with the service provider, registration control section 172 reads out the certificate stored in certificate storage section 171 and transmits the read certificate to connection accepting apparatus 153, via server connection control section 131.

Figure 9:
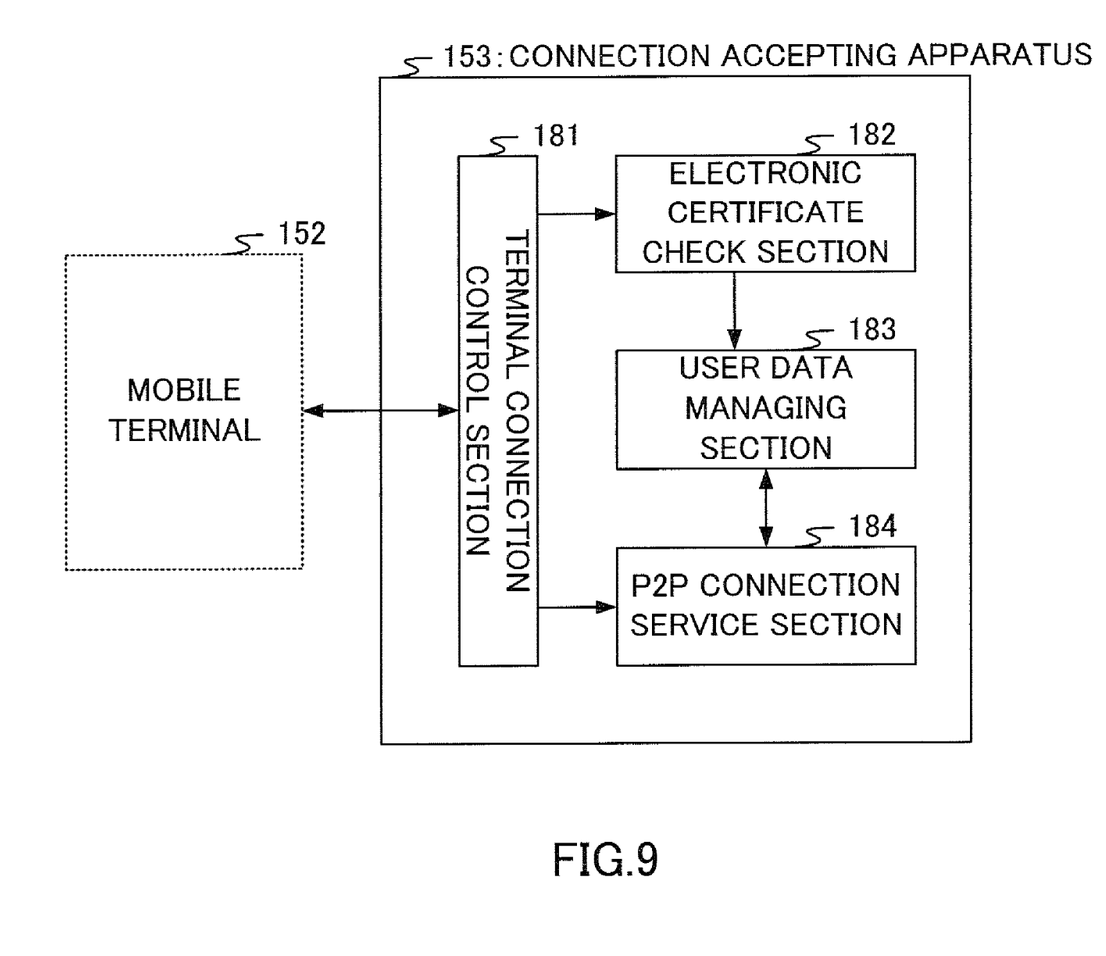
FIG. 9 is a block diagram showing the internal configuration of a connection accepting apparatus shown in FIG. 6.

FIG. 9 is a block diagram showing an internal configuration of connection accepting apparatus 153 shown in FIG. 6. In this figure, terminal connection control section 181 is an interface that controls the connection to mobile terminal 152, and mediates communication between electronic certificate check section 182 and mobile terminal 152, and the communication between P2P connection service section 184 and mobile terminal 152.

When electronic certificate check section 182 receives the certificate transmitted from mobile terminal 152, via terminal connection control section 181, it checks whether the received certificate has been issued by server apparatus 151, and whether mobile terminal 152 is capable of P2P connection with electrical appliance 101, in other words, it checks whether the certificate is correct. When the certificate is correct, the certificate is reported to user data managing section 183. On the other hand, when the certificate is not issued by server apparatus 151, or when mobile terminal 152 is not able to establishing a P2P connection with electrical appliance 101 (in other words, when the certificate is incorrect), this is reported to mobile terminal 152.

User data managing section 183 registers the user information based on the content of the certificate reported from electronic certificate check section 182.

Upon receiving a P2P connection request from mobile terminal 152 that has finished user registration, via terminal connection control section 181, P2P connection service section 184 checks whether the user information of mobile terminal 152 that made the P2P connection request is registered in user data managing section 183, and provides P2P connection service only to mobile terminal 152 whose user information is registered.

In this way, mobile terminal 152 can check whether P2P connection to electrical appliance 101 is possible before user registration is performed in connection accepting apparatus 153, so that it is possible to prevent the situation where P2P connection with electrical appliance 101 cannot be established after user registration in connection accepting apparatus 153 has been finished. However, when the Internet connection environment of the private network changes after user registration, it is necessary to perform connectivity check by performing user registration again, for example.

According to embodiment 2, the mobile terminal user performs user registration with the service provider, using a certificate which certifies that a P2P connection can be established between the mobile terminal and the electrical appliance, so that it is possible to prevent the situation where the P2P connection between the mobile terminal and the electrical appliance cannot be established after user registration has been finished.

In the present embodiment, although the connection accepting apparatus has been described as a device apart from the server apparatus, the present invention is not limited to this, and the function of the connection accepting apparatus may be incorporated in the server apparatus.

According to a first aspect of the present invention, an Internet server apparatus performs preparation processing for direct connection between an electrical appliance inside a private network connected to the Internet, and a mobile terminal outside the private network, and this server apparatus includes: a detecting section that detects a failure in the preparation processing for direct connection between the electrical appliance and the mobile terminal; and a reporting section that reports information showing the failure detected by the detecting section, to the mobile terminal.

According to this configuration, by detecting a failure in the preparation processing for direct connection between the electrical appliance and the mobile terminal and reporting information showing the detected failure to the mobile terminal, it is possible to report the cause of the failure to the user from the mobile terminal.

According to a second aspect of the present invention, in the server apparatus of the above aspect, the detecting section detects the failure in the preparation processing for direct connection between the electrical appliance and the mobile terminal by receiving a report showing a failure of the electrical appliance in controlling settings of a NAT router provided in the private network.

According to this configuration, by reporting to the mobile terminal the failure of the electrical appliance in controlling the settings of the NAT router in the preparation processing for direct connection between the electrical appliance and the mobile terminal, it is possible to report this information to the user from the mobile terminal.

According to a third aspect of the present invention, the server apparatus of the above aspect further has a receiving section that receives setting information and address information of the NAT router provided in the private network from the electrical appliance, and, when the server apparatus attempts to connect to the electrical appliance based on the setting information and address information of the NAT router received by the receiving section, the detecting section detects a failure of the connection.

According to this configuration, by reporting to the mobile terminal the failure of direct connection upon an attempt at direct connection to the electrical appliance in the preparation processing for direct connection between the electrical appliance and the mobile terminal, it is possible to report this information to the user from the mobile terminal.

According to a fourth aspect of the present invention, the server apparatus of the above aspect further has a storage section that stores setting information and address information of a NAT router provided in the private network, as connection information for the electrical appliance, and the detecting section detects a failure of the storage section in acquiring the connection information by confirming that the connection information for an electrical appliance to which connection from the mobile terminal is desired, is not stored in the storage section.

According to this configuration, in the preparation processing for direct connection between the electrical appliance and the mobile terminal, it is possible to confirm that the connection information for the electrical appliance to which connection from the mobile terminal is desired, is not stored in the storage section, and report the failure of the storage section in acquiring the connection information to the mobile terminal.

According to a fifth aspect of the present invention, the server apparatus of the above aspect further has: a status managing section that receives from the electrical appliance a report of successful direct connection to the mobile terminal and acquires from the mobile terminal a report of successful direct connection to the electrical appliance; a certificate issuing section that, when the status managing section acquires the reports of successful direct connection from the electrical appliance and the mobile terminal, issues an electronic certificate that certifies that direct connection to the electrical appliance and the mobile terminal is possible; and a transmitting section that transmits the certificate issued by the certificate issuing section to the mobile terminal.

According to this configuration, it is possible to issue a certificate which certifies that direct connection between the electrical appliance and the mobile terminal is possible upon receipt of a report of successful direct connection from both the electrical appliance and the mobile terminal that have successfully established direct connection between them.

According to a sixth aspect of the present invention, the server apparatus of the above aspect further has: a check section that checks whether the certificate transmitted from the mobile terminal is issued by the server apparatus and whether direct connection to an electrical appliance to which connection from the mobile terminal is desired, is possible; and a user data managing section that, when the check section decides that the certificate is issued by the server apparatus and that direct connection to the electrical appliance to which connection from the mobile terminal is desired, is possible, registers user information of a user of the mobile terminal.

According to this configuration, by registering user information when it is checked that the certificate has been issued by the server apparatus and that direct connection to the electrical appliance to which connection from the mobile terminal is desired, is possible, it is possible to prevent the situation where the mobile terminal and the electrical appliance cannot establish direct connection between them after user information registration.

According to a seventh aspect of the present invention, a mobile terminal is outside a private network and establishes direct connection to an electrical appliance inside a private network connected to the Internet, and this mobile terminal has: a detecting section that detects a failure in preparation processing for direct connection between the electrical appliance and the mobile terminal or receives information showing the failure; and a reporting section that reports the information showing the failure to a user.

According to this configuration, it is possible to detect a failure in the preparation processing for direct connection to the electrical appliance, or receive information showing the failure, and report this information showing the failure, to the user.

According to an eighth aspect of the present invention, in the mobile terminal of the aspect, upon an attempt at connection to the server apparatus, the detecting section detects a failure of the connection.

According to this configuration, in the preparation processing for direct connection between the electrical appliance and the mobile terminal, by detecting the failure of direct connection upon an attempt at direct connection to the server apparatus, it is possible to report failed connection to the server apparatus to the user.

According to a ninth aspect of the present invention, in the mobile terminal of the above aspect, upon an attempt at direct connection to the electrical appliance, the detecting section detects a failure of the direct connection.

According to this configuration, in the preparation processing for direct connection between the electrical appliance and the mobile terminal, by detecting the failure of direct connection upon an attempt at direct connection to the electrical appliance, it is possible to report failed connection to the electrical appliance to the user.

According to an tenth aspect of the present invention, the mobile terminal of the above aspect further has a transmitting section that, when direct connection to the electrical appliance is successful, transmits a report of successful direct connection to the server apparatus.

According to this configuration, by sending to the server apparatus, a report of successful direct connection to the electrical appliance, the server apparatus can recognize that the mobile terminal and the electrical appliance can establish direct connection.

According to an eleventh aspect of the present invention, the mobile terminal of the above aspect further has: a certificate storage section that stores an electronic certificate transmitted from a server apparatus; and a registration control section that performs user registration with a service provider which provides direct connection service with the electrical appliance inside the private network, by using the electronic certificate stored in the certificate storage section.

According to this configuration, by performing user registration with a service provider which provides direct connection service with the electrical appliance inside the private network, by using the electronic certificate transmitted from the server apparatus, it is possible to prevent the situation where the mobile terminal and the electrical appliance cannot establish direct connection between them after user registration.

According to a twelfth aspect of the present invention, an electrical appliance has: a NAT setting control section that controls settings of a NAT router; and a NAT setting information reporting section that, when the NAT setting control section fails to control the settings of the NAT router, reports information showing the failure to a server apparatus.

According to this configuration, in the preparation processing for direct connection between the electrical appliance and the mobile terminal, by reporting to the server apparatus information showing a failure in NAT router setting control, it is possible to report to the mobile terminal user that the setting control for the NAT router has failed, via the server apparatus.

According to a thirteenth aspect of the present invention, the electrical appliance of the above aspect further has a transmitting section that, when direct connection to a mobile terminal outside a private network is successful, transmits a report of successful direct connection to the server apparatus.

According to this configuration, by transmitting to the server apparatus a report of successful direct connection to the mobile terminal, the server apparatus can recognize that the mobile terminal and the electrical appliance can establish a direct connection.

According to a fourteenth aspect of the present invention, a communication system has: an electrical appliance inside a private network connected to the Internet; a mobile terminal outside the private network; and an Internet server apparatus that performs preparation processing for direct connection between the electrical appliance and the mobile terminal, and, in this communication system, the mobile terminal receives from the server apparatus information showing a failure in the preparation processing for direct connection between the electrical appliance and the mobile terminal and reports the received information to a user.

According to this configuration, by detecting a failure in the preparation processing for direct connection between the electrical appliance and the mobile terminal and reporting information showing the detected failure to the mobile terminal, it is possible to report to the user the cause of the failure from the mobile terminal.

According to a fifteenth aspect of the present invention, a communication method includes: a detecting step of detecting in an Internet server apparatus, the Internet server apparatus performing preparation processing for direct connection between an electrical appliance inside a private network connected to the Internet and a mobile terminal outside the private network, a failure in the preparation processing for direct connection between the electrical appliance and the mobile terminal; a reporting step of reporting information showing the failure detected by the server apparatus in the detecting step to the mobile terminal; a receiving step of receiving at the mobile terminal the information reported from the server apparatus; and a reporting step of reporting the information received in the receiving step to a mobile terminal user.

According to this method, by detecting a failure in the preparation processing for direct connection between the electrical appliance and the mobile terminal and reporting information showing the detected failure to the mobile terminal, it is possible to report to the user the cause of the failure from the mobile terminal.

According to a sixteenth aspect of the present invention, a program causes a computer in a server apparatus to implement functions of: a detecting section that detects a failure in preparation processing for direct connection between an electrical appliance inside a private network connected to the Internet, and a mobile terminal outside the private network; and a reporting section that reports information showing the failure detected by the detecting section to the mobile terminal.

According to this program, by detecting a failure in the preparation processing for direct connection between the electrical appliance and the mobile terminal and reporting information showing the detected failure to the mobile terminal, it is possible to report to the user the cause of the failure from the mobile terminal.

According to a seventeenth aspect of the present invention, a program causes a computer in a mobile terminal to implement functions of: a detecting section that detects a failure in preparation processing for direct connection between an electrical appliance inside a private network connected to the Internet, and a mobile terminal outside the private network; and a reporting section that reports information showing the failure detected by the detecting section to a user.

According to this program, it is possible to detect a failure in the preparation processing for direct connection between the electrical appliance and the mobile terminal and report information showing the detected failure to the user.

According to a eighteenth aspect of the present invention, a program that causes a computer in an electrical appliance to implement functions of: a NAT setting control section that controls settings of a NAT router; and a NAT setting information reporting section that, when the NAT setting control section fails in controlling the settings of the NAT router, reports information showing the failure to a server apparatus.

According to this program, in the preparation processing for direct connection between the electrical appliance and the mobile terminal, by reporting to the server apparatus information showing a failure in the NAT router setting control, it is possible to report to the mobile terminal user the failure of the NAT router setting control via the server apparatus.

The present application is based on Japanese Patent Application No. 2004-332021, filed on Nov. 16, 2004, the entire content of which is expressly incorporated by reference herein.

INDUSTRIAL APPLICABILITY

The server apparatus, mobile terminal, electrical appliance, communication system, communication method and program according to the present invention can be applied to appliance for the Internets, mobile phones, etc.

The invention claimed is:

1. A mobile terminal outside a private network that is connected to the Internet, the mobile terminal being configured to establish a direct connection to an electrical appliance that is inside the private network, the mobile terminal comprising:
　　a detecting section that detects a failure of preparation processing for the direct connection between the electrical appliance and the mobile terminal, or receives first information showing the failure;
　　a reporting section that reports, to a user, second information showing the detected failure or the received first information;
　　a certificate storage section that stores an electronic certificate transmitted from a server apparatus; and
　　a registration control section that performs user registration with a service provider that provides a direct connection service with the electrical appliance, using the electronic certificate stored in the certificate storage section.

2. The mobile terminal according to claim 1, wherein the detecting section is configured to detect the failure, or receive the first information showing the failure, upon an attempt at connection to the server apparatus.

3. The mobile terminal according to claim 1, wherein the detecting section is configured to detect the failure, or receive the first information showing the failure, upon an attempt at the direct connection to the electrical appliance.

4. The mobile terminal according to claim 1, further comprising a transmitting section that, when the direct connection to the electrical appliance is successful, transmits, to the server apparatus, a report of the successful direct connection.

5. A computer implemented program that causes a computer, provided in a mobile terminal that is outside a private network connected to the Internet, to implement functions of:
- a detecting section that detects a failure of preparation processing for a direct connection between an electrical appliance and the mobile terminal, or receives first information showing the failure, the electrical appliance being inside the private network;
- a reporting section that reports, to a user, second information showing the detected failure or the received first information;
- a certificate storage section that stores an electronic certificate transmitted from a server apparatus; and
- a registration control section that performs user registration with a service provider that provides a direct connection service with the electrical appliance, using the electronic certificate stored in the certificate storage section.

* * * * *